United States Patent
Laurent et al.

(10) Patent No.: US 7,206,769 B2
(45) Date of Patent: Apr. 17, 2007

(54) ELECTRONIC WALLET SYSTEM

(75) Inventors: Christophe Laurent, Vignoc (FR); Sylvain Lelièvre, Rennes (FR); Yan-Mei Tang-Talpin, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 845 days.

(21) Appl. No.: 09/798,739

(22) Filed: Mar. 2, 2001

(65) Prior Publication Data

US 2001/0021927 A1 Sep. 13, 2001

(30) Foreign Application Priority Data

Mar. 7, 2000 (EP) .................. 00400606

(51) Int. Cl.
*G06Q 99/00* (2006.01)

(52) U.S. Cl. .......................... 705/65; 705/66
(58) Field of Classification Search ............... 709/200; 705/1, 10, 14, 41, 44, 65, 66; 235/375
See application file for complete search history.

(56) References Cited

U.S. PATENT DOCUMENTS 6,032,135 A 2/2000 Molano et al. ............... 705/41
6,250,557 B1* 6/2001 Forslund et al. ............. 235/492
6,282,522 B1* 8/2001 Davis et al. .................. 705/41
6,753,830 B2* 6/2004 Gelbman ...................... 345/55

FOREIGN PATENT DOCUMENTS

| EP | 793 186 A3 | 12/1997 |
| EP | 924 667 A2 | 6/1999 |
| JP | 2001266029 | * 9/2001 |
| WO | WO97/04609 | 2/1977 |
| WO | WO00/11624 | 3/2000 |

* cited by examiner

*Primary Examiner*—Elisca Pierre Eddy
(74) *Attorney, Agent, or Firm*—Joseph J. Laks; Robert D. Shedd; Paul P. Kiel

(57) ABSTRACT

The electronic wallet system comprises a plurality of devices interconnected through a local network and capable of conducting electronic business transaction on an open network (40). Each device contains a smart card reader. A plurality of smart cards (31–3p) represent the electronic purses of the system. One of the devices comprises an entity called the server which contains a list of purses liable to receive tokens from others purses of the system. The tokens transferred between purses are stored temporally by said server.

Application to a family wallet system allowing children to participate to electronic commerce.

The system makes it possible to transfer tokens from one first purse to a second purse without having in hands the smart card corresponding to the second purse.

18 Claims, 4 Drawing Sheets

ELECTRONIC WALLET SYSTEM

FIELD OF THE INVENTION

The present invention relates generally to electronics wallets for performing electronic commercial transactions on open networks such as internet, and more particularly to a new electronic wallet architecture and to methods for transferring tokens (or electronic money units) between electronics wallets.

BACKGROUND ART

Nowadays, a large part of customers often use credit card to make purchase. With this kind of payment system, the cardholder can prove his identity thanks to the knowledge of a secret PIN (Personal Identification Number) stored in the card and, if it is not sufficient, thanks to identification papers located in his wallet.

With the advent of electronic commerce (or e-commerce), all schemes executed every days by customers and merchants can be repeated in the electronic world with few modifications and with the setup of new materials and applications.

Identification papers that proves the identity of an end-entity (customer or merchant) are now replaced by digital certificates and classical wallets which are used in the real world are replaced by electronic wallets (also called E-wallets).

The digital certificates are today largely used by the e-commerce community and are out of the scope of this patent application.

The notion of E-wallet, as disclosed for example in "Merkow M. S., Breithaupt J. and Wheeler K. L., *"Building SET Applications for Secure Transactions"*, Wiley Computer Publishing, 1998" covers a computer application allowing a consumer to store private information (e.g. credit cards numbers, name, address, etc.) on his PC and to retrieve that information quickly and securely for the purpose of online shopping for example.

Various E-wallet systems have been proposed recently. Some of them are dedicated to the storage of digital certificates in order to provide an easy way to make purchase via "macropayment" schemes such as SET (a standardized e-commerce protocol, information about which can be found in "Loeb L., *"Secure Electronic Transactions: Introduction and Technical Reference"*, Artech House Publishers, 1998"). Among these products are the IBM Consumer Wallet™ (information about it can be found in the internet publication "http://www-4.ibm.com/.software/commerce/payment/wallet.html") or the GlobeSet Wallet™ (information about it can be found in the internet publication "http://www.globeset.com/Products/Wallet/wallet.shtml").

Other systems manage digital coins, or tokens, to make "micropayment" transactions, for example to purchase low value items; while others manage several kinds of data (digital certificates as well as digital coins).

However, if we compare the features offered by the current E-wallets to those satisfied by the wallets used in the real world, we can see that a typical wallet proposes more functionality since we can also exchange money from one wallet to another, store tickets, invoices, pictures, etc.

In addition, all current e-commerce protocols need the user's bank account to make purchase and thus, children are left outside of e-commerce activities.

The present invention is therefore directed to the problem of developing a new electronic wallet which provides more functionality than existing electronic wallets and which is more "family-oriented". Particularly, it should allow children to participate to e-commerce by having their own purse for micropayment transactions and it should allow the same operations as "real-life" wallets (storage of tokens, token transfer facilities between purses, etc.).

SUMMARY OF THE INVENTION

The present invention solves this problem by providing an electronic wallet system comprising n devices capable of conducting electronic business transaction on an open network and containing a smart card reader, wherein n is superior or equal to 1, and a plurality of smart cards representing electronic purses able to contain tokens. The devices are interconnected through a local network and one of said devices comprises an entity, called the server, which contains a list of data entries, each entry corresponding to a purse liable to receive tokens from others purses of the system.

The devices are preferably set-top boxes but in another embodiment of the invention, the devices may be computers or workstations.

The tokens transferred between purses are stored temporally by the server.

According to a preferred embodiment of the invention, tokens are transferred from one first purse to a second purse in two stages: the tokens assigned to the second purse are deposited with the server from the first purse during the first stage, and the tokens are credited to the second purse from the server during the second stage. Advantageously, the operations executed during the first stage and the operations executed during the second stage are performed in two different times.

According to a further aspect of this embodiment, tokens transferred from one first purse to a second purse are decrement from said first purse when the transfer is registered by the server and are incremented on said second purse when the smart card corresponding to said second purse is inserted in a smart card reader of one device.

According to another aspect of the invention, each of said device further comprises an entity, called the client and the operations executed during each of said first stage or second stage may be performed from anyone of said clients.

Thanks to the invention, it is possible to transfer tokens to another purse (registered on the server) without having in hands the corresponding smart card. One advantage of this new electronic wallet system is that it is family-oriented. Each member of the family, including children, can have his/her own purse and use it to make electronic purchases.

With the new feature of the invention, children can now participate to electronic financial operations by making purchase of low value items through micropayment transactions by using their personal purse.

The new electronic wallet system replaces, among others, the pocket money currently used in the real world. Therefore, when one of the parents wants to give money to a child, he/she first has to charge his/her purse with tokens via a classical macropayment transaction (for instance SET) which needs a bank account number. Then, he/she only has to perform an inter-purse operation to transfer a certain amount of tokens from his/her own purse towards the purse of his/her child.

Thanks to the fact that the inter-purse transfer of tokens is managed by the server, the parents do not need to have the smart card representing the purses of their children to charge them with tokens.

The invention also relates to a process for registering a purse in the server of a system as the above-mentioned one. This process comprises the steps consisting for a device, preferably the device containing the server, in:

receiving a specific smart card, called the root card;

receiving a personal identification number entered by a user on said device;

verifying that said entered personal identification number matches a personal identification number stored in said root card; and, should verification be positive:

receiving a smart card corresponding to the purse to be registered, said smart card containing a purse identifier; and storing said purse identifier in the list of data entries contained in said server.

In a preferred embodiment a smart card purse transaction identifier is stored in the smart card corresponding to the registered purse and is initialized to zero and a server purse transaction identifier is stored in the data entry corresponding to the registered purse in the server and is initialized to zero.

The invention further concerns a process for depositing tokens from a first purse for a second purse in an electronic wallet system as the above-mentioned one. This process comprises the steps consisting, for a device containing a client entity, in:

a) receiving a first smart card corresponding to the first purse;

b) sending a first message to the server to request a token deposit;

c) receiving from the server a list of purses liable to receive tokens and d) sending a second message containing an amount of tokens and a purse identifier corresponding to the second purse to deposit the amount of tokens with the server for the second purse.

Another similar process according to the invention comprises the steps consisting, for a device containing the server, in:

i) receiving from a client a first message requesting a token deposit;

j) sending to the client a list of purses liable to receive tokens;

k) receiving from the client a second message containing an amount of tokens and a purse identifier corresponding to the second purse; and l) storing the amount of tokens in the data entry corresponding to the second purse.

The invention also relates to a process for receiving tokens in a second purse in an electronic wallet system as the above-mentioned one. This process comprises the steps consisting, for a device containing a client entity, in:

m) receiving a smart card corresponding to the second purse;

n) sending a fourth message to the server to request the receipt of tokens deposited with the server for the second purse;

o) receiving a fifth message containing a number N of actions stored by the server in the data entry corresponding to the second purse, each action containing an amount of tokens received from one purse of the electronic wallet system; and p) for each action i between 1 to N:

p1) sending a sixth message to the server to request the next action i;

p2) receiving a seventh message from the server containing the action i; and p3) storing in the smart card corresponding to the second purse the amount of tokens contained in the action i.

According to another aspect of the invention, this process further comprises the steps consisting:

for the device containing a client, in concatenating the smart card purse transaction identifier corresponding to the second purse to said sixth message sent at step p1);

for the device containing the server:

in verifying that the smart card purse transaction identifier equals the server purse transaction identifier stored in the server in the second purse data entry and, should verification be positive:

in incrementing the server purse transaction identifier stored in the server, and in concatenating said incremented server purse transaction identifier to the seventh message; and for the device containing a client, in verifying that the server purse transaction identifier received at step p2) in the seventh message equals the smart card purse transaction identifier minus one, and should verification be positive, in performing step p3).

BRIEF DESCRIPTION OF THE DRAWINGS

The various features of the present invention and its preferred embodiment will now be better understood by referring to the following description and the accompanying drawings in which like reference numerals refer to like elements in the several figures. The content of the following description and the drawings are set forth as example only and should not be understood to represent limitations upon the scope of the present invention. In the drawings.

DESCRIPTION OF THE PREFERRED EMBODIMENTS

Figure 1:
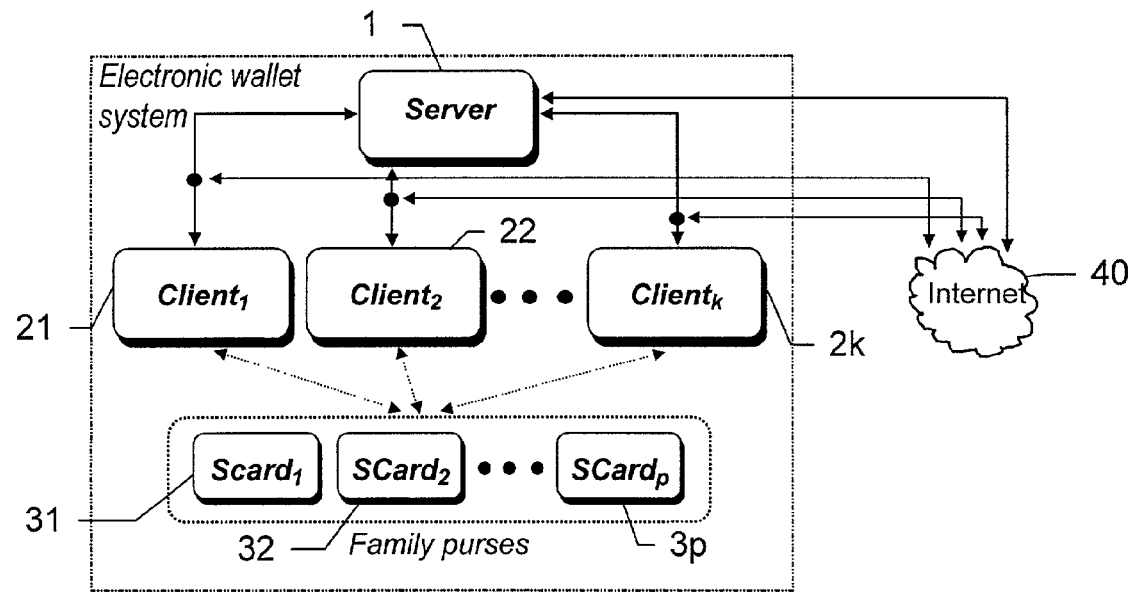
FIG. 1 illustrates the general architecture of an electronic wallet system according to the invention.

FIG. 1 illustrates the general architecture of an electronic wallet system according to the invention which corresponds to the configuration of the system in a family.

As it can be seen on this figure, this typical electronic wallet system contains three entities:

a first entity 1 called the server which is connected to an open network 40 (for example internet). This entity is responsible of the inter-purses operations, as will be explained in more details bellow, and the storage of digital certificates, invoices, etc. for the members of the family;

a set of k second entities 21 to 2k called clients which are also connected to an open network (e.g. Internet). Moreover, each of these clients is also connected to the server via a local home network;

a set of p smart cards 31 to 3p, the third entities (where p is the number of persons in the family) which implement the purses. Thus, each member of the family possesses his own purse represented by a smart card.

From these different entities, each member of the family should be able to participate to secured e-commerce activities. In fact, a smart card provides to the user an efficient and secure way to store all personal and sensitive data such as private keys, digital tokens, authentication data, etc.

Figure 2:
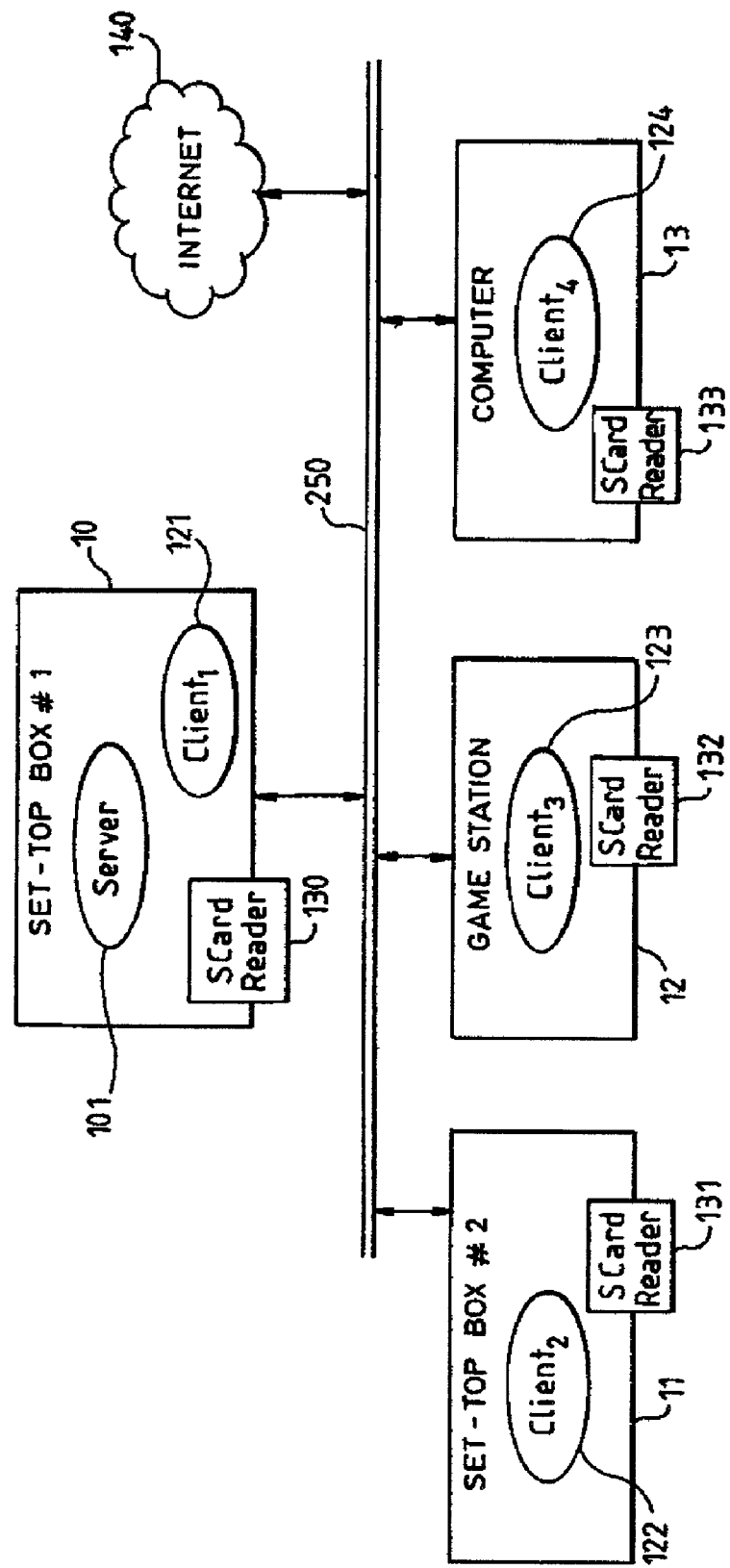
FIG. 2 illustrates an example of hardware architecture of an electronic wallet system according to the invention.

An example of hardware implementation of this architecture is illustrated in FIG. 2. The entities "Server" and "Clients" are implemented, in a preferred embodiment, by software applications running in devices such as set-top boxes, computers, game stations, portable phones or any other home equipment.

In the example of FIG. 2, a first set-top box 10 contains the server application 101 and one Client$_1$ application 121. This first set-top box is for example located in the living-room of the family house. A second set-top box 11, located in another room of the house, contains another Client$_2$ application 122, while two other devices, a game station 12 and a computer 13, located in children bedrooms for example, contain respectively Client$_3$ application 123 and Client$_4$ application 124. The devices are equipped with smart card readers 130–133 and are all connected to a home network 250, which may be an IEEE 1394 wire or wireless network. This home network 250 provides a connection to an open network 140 for all the devices 10–13.

All the applications 101, 121–124 use some resources of the devices to access to the smart card readers 130–133 and to the local and /or open network.

In order to simplify the further discussion, the terms "server" and "client" will be used hereafter to refer either to the application itself or to the device containing the application, with the exception that the device referred to as "server" also contains a client application.

Thus, when the user wants to perform electronic financial operations (electronic commerce, token purchase, purse-to-purse token transfer . . . ), he has to insert his smart card in the smart card reader of a client (here, the device) that contains all needed software in order to perform all of these activities (macropayment protocols, micropayment protocols, etc.).

It should be noted that the server is also capable of performing electronic financial and business operations because it also contains a client and that, in an extreme solution, the electronic wallet system contains only one device containing the server application and one client application.

Contrary to classical financial operations (e-commerce, token purchase, etc.), the inter-purses operations need the participation of the server. All needed information used to make these inter-purses operations are centralized in the server which is connected to all clients via a local home network (250 in FIG. 2).

Indeed, when a user A wants to deposit X tokens on a purse $P_B$ of a user B, the electronic wallet system, and more precisely the server, will keep a trace of the transaction in order to charge the purse $P_B$ with x token at its next use. Advantageously, this functionality is possible even if the client in which the purse $P_B$ is inserted is not the same as the one used by the user A to make the token transfer.

To this end, the server contains a list of all registered purses representing the purses which can receive tokens from other purses. It also contains, for each registered purse, a list of "actions" to execute at the next use of the purse. An "action" represents the fact that a number of tokens x has been transferred from a purse $P_Y$ to the registered purse.

Figure 3:
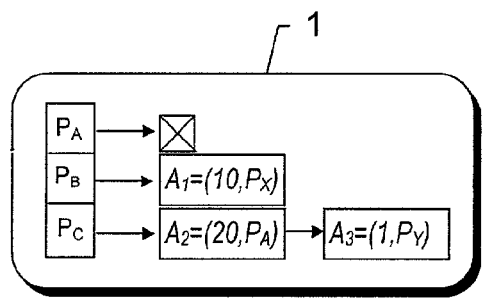
FIG. 3 illustrates some data contained in one entity called the server of the electronic wallet system.

FIG. 3 shows an example of the server's content. On FIG. 3, three purses $P_A$, $P_B$ and $P_C$ are registered in the server. The process for registering a purse in the server will be explained bellow.

As for purse $P_A$, no action has been stored meaning that no token has been transferred to purse $P_A$ from another purse. As for purse $P_B$, an action $A_1$, denoted by $(10, P_X)$ (meaning that purse $P_B$ has received 10 tokens from purse $P_X$), is stored and will be executed at the next use of purse $P_B$ as explained bellow.

As for purse $P_A$, actions $A_2$ (20 tokens received from purse $P_A$ to purse $P_C$) and $A_3$ (1 token received from purse $P_Y$ to purse $P_C$) will be executed at the next use of $P_C$.

We will now describe two processes involved in the inter-purse transfer of tokens. The first one is called "token deposit" and designates the process executed when a user A wants to transfer tokens from his own purse towards a registered purse of a user B. The second one is called "token receipt" and designates the reverse process which is executed when the user B inserts his smart card in a client.

It is important to note that a user who whishes to receive tokens from other people must make his purse registered on the server whereas a user who only wants to transfer tokens from his purse to other purses does not need to register his purse on the server.

Figure 4:
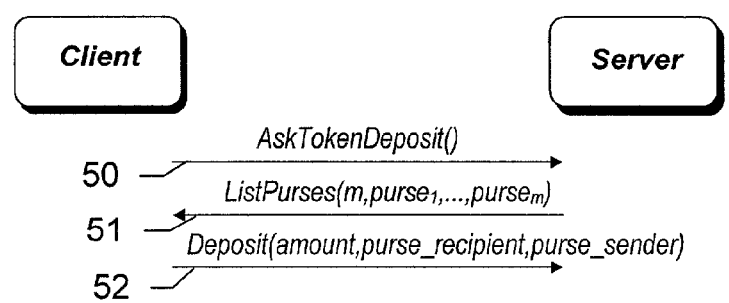
FIG. 4 illustrates a first process involved in the transfer of tokens from one purse of the electronic wallet system to another.

We will first describe the process of "token deposit" in view of FIG. 4.

When a user A who owns a purse $P_A$ desires to transfer tokens to another purse, the user A has first to insert his smart card corresponding to purse $P_A$ in a client and to chose, via the user interface of the client, the application for transferring tokens to another purse. Then, the client on which the user A is connected sends a request to the server (message "AskTokenDeposit( )" sent at step 50—FIG. 4) and the server sends back in response the list of all registered purses (designating those which can receive tokens) in a message "ListPurses(m,purse$_1$, . . . , purse$_m$)" (step 51). "m" designates the number of registered purses and "purse$_1$, . . . , purse$_m$" designate the different purse identifiers of the list.

Once the client receives this list, it displays it to the user A who can choose the recipient $P_X$ of the token transfer and the amount of tokens to be transferred. Next, the client sends to the server a message "Deposit(amount, purse_recipient, purse_sender)" (at step 52) wherein "amount" corresponds to the number of tokens to transfer, "purse_recipient" is the recipient's purse identifier (here, it corresponds to $P_X$) and "purse_sendee" is an information about the sender of the tokens. Advantageously this information will be the sender's purse identifier $P_A$ or the name of user A. When the server receives this message, it adds an action $A_i=(amount, P_A)$ in the list of actions memorized for purse $P_X$.

Figure 5:
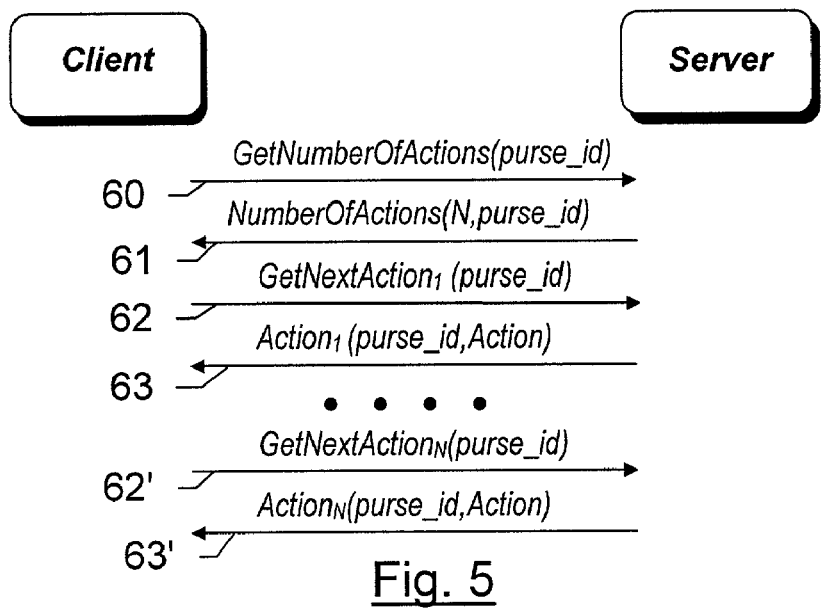
FIG. 5 illustrates a second process involved in the transfer of tokens from one purse of the electronic wallet system to another.

We will now describe the "token receipt" process in view of FIG. 5.

This process is executed each time a user X inserts his smart card in a client. It is used to contact the server in order to execute all actions stored in the server to credit the purse $P_X$ owned by the user X. Of course, this process may be executed from any client, no matter in which client the first process of "token deposit" has been executed.

In a first step 60, a message "GetNumberOfActions (purse_id)", where "purse_id" is the identifier of the purse $P_X$, is sent by the client to the server. In response to this request, the server retrieves the entries in the list of actions corresponding to the purse_id and return the size of the list of actions attached to this purse ($P_X$ in the present example) in a message "NumberOfActions(N,purse_id)" sent to the client at step 61. "N" represents the number of actions memorized for purse $P_X$ to be executed and "purse_id" is copied from the message "GetNumberOfActions(purse_id)". Then, the client verifies that the purse_id is the same that was sent in the "GetNumberOfActions(purse_id)" message and stores the number N of actions to execute.

Then, for each action i from 1 to N stored in the server for purse $P_X$, the two following messages will be exchanged at steps 62, 63 to 62', 63'. The first message "GetNextAction$_i$ (purse_id)" is sent by the client to the server with "purse_id" being the identifier of the purse $P_X$. On receipt of this message, the server copies the first action of the list attached to the purse $P_X$ (c.f. FIG. 3) and clears this action. Then, it sends the second message "Action$_i$(purse_id Action)", where "purse_id" is the identifier of purse $P_X$ and "Action" is the action to execute (for example: 10 tokens received from purse $P_A$ to purse $P_X$), to the client. When the client receives this second message, it executes the action to charge purse $P_X$ with the number of tokens indicated in "Action".

Security Issues

Before participating in e-commerce activities as well as inter-purses operations with the electronic wallet system of the invention, the user must be sure that the system cannot be easily attacked and for this purpose, solutions providing a sufficient level of security have to be proposed.

First of all, the system must be able to authenticate a user when he/she enters his/her smart card in a client. This feature avoids the use of a smart card by another user than the owner of the card. Moreover, the smart card must also be authenticated in order to ensure that the used card has really been provided by the electronic wallet system manufacturer.

Then, as mentioned previously, a purse must be registered on the server before it can receive tokens from another purse. However, it is necessary to ensure that this registration phase cannot be executed by anybody since in this case, an intruder can register his own purse and route all token transfer messages (messages "Desposit(amount,purse_recipient,purse_sender)" and "Action$_i$(purse_id Action)") towards his purse. In fact, only the members of one family should be able to have their purses registered on the server.

In addition, some messages exchanged between a client and the server (during "token deposit" and "token receipt" process—FIGS. 4 and 5) have to be protected to ensure that the amount of transfer as well as the recipient purse cannot be modified by a fraudulent user during transmission.

Moreover, messages between the client and the smart card representing the purse, and dedicated to credit or debit tokens should be protected to avoid replay attacks by fraudulent users. A replay attack consists in sending several time a message, for example a message containing an action to credit the purse.

We will now describe the security features which are provided to the electronic wallet system of the invention.

First of all, we suppose that each system contains a shared secret key denoted by DFW_SK, which is provided by the system manufacturer and which is stored in a secure fashion on each entity of the electronic wallet system (clients, server and smart cards).

1. User and Smart Card Authentication

This functionality aims at:

(i) authenticating a purse/smart card holder to be the legitimate owner of the purse so that if the purse/smart card is lost or stolen, it cannot be used by others to make purchase;

(ii) authenticating that the used smart card has been provided by the electronic wallet system manufacturer so that if an intruder makes his own card, it will be immediately detected.

The proposed solution needs the communication between the smart card and the client in which the card is inserted, and does not involve the server as will be explained below in view of FIGS. 6 and 7.

Figure 6:
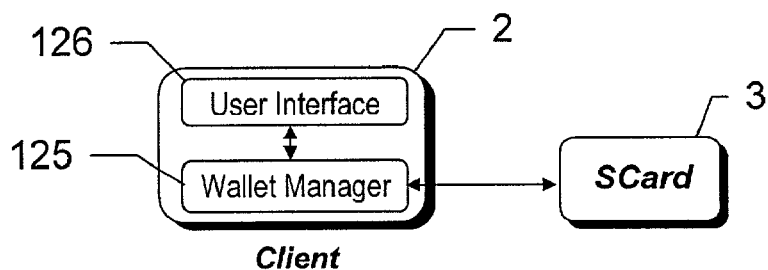
FIG. 6 illustrates a second entity called the client and a third entity, a smart card, of the electronic wallet system.

FIG. 6 represents a client 2 (such as entities 21, 22 to 2k in FIG. 1) in which a smart card 3 is inserted. In fact, as explained previously in view of FIG. 2, the smart is inserted in the smart card reader of a device containing the client application.

The communication between the smart card and the client is performed via a software 125 called Wallet Manager that runs on each client and that allows interfacing the user (through the user interface software 126) and the smart card.

Each member of the family possesses a unique PIN (Personal Identification Number) which is kept secret from others and which is linked to his/her purse. The hashing H(PIN) (where H is a one-way function) of this PIN is stored in the purse of the user.

Therefore, when the user inserts his/her card in a client to perform financial operations, he/she first has to enter his/her PIN. This entered PIN is then sent to the Wallet Manager that computes H(entered PIN).

Now, the retained solution to provide authentication is based on a mutual authentication process which uses a challenge-response based on symmetric-key encryption algorithms, more details about which can be found in ""Handbook of Applied Cryptography", Menezes A., Van Oorschot P. C and Vanstone S. A., CRC Press, 1997".

Figure 7:
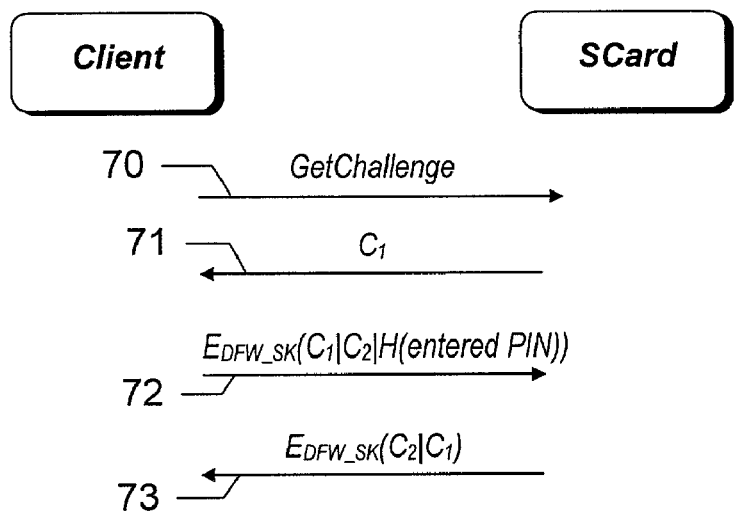
FIG. 7 illustrates a process for authenticating a purse user.

FIG. 7 illustrates the exchanged messages during this authentication process.

During the first step 70, the client asks for a challenge to the card by sending a message "GetChallenge". The smart card responds by sending a first challenge denoted by "$C_1$" at step 71. A challenge is a random number which is different at each new authentication process and which is used to prevent a "replay attack".

From this challenge $C_1$ received from the smart card, the client forms a message M by concatenating the challenge $C_1$, a new challenge generated in the client denoted by $C_2$ and the H(entered PIN) value that is M=$C_1$|$C_2$|H(entered PIN). This message M is then encrypted using the shared secret key DFW_SK and the encrypted message "$E_{DFW\_SK}$($C_1$|$C_2$|H(entered PIN))" is sent to the card at step 72.

When the card receives this encrypted message, it can easily retrieve M and all of its components using the decryption process and the shared secret key DFW_SK of the electronic wallet system contained in the smart card (in this case, this will show that the smart card has been provided by the electronic wallet system manufacturer and thus ensures that aim (ii) mentioned above is achieved).

The smart card then verifies that the decrypted challenge $C_1$ matches the challenge $C_1$ sent at step 71. If the verification succeeds, the card proceeds to the PIN verification by verifying that H(PIN)=H(entered PIN). In this case, the user is authenticated as being the legitimate owner of the purse and the process can continue.

A new message M' is then created by concatenating the two challenges $C_2$ and $C_1$. This message is encrypted using the DFW_SK key and the encrypted message "$E_{DFW\_SK}(C_2|C_1)$" is sent back to the client at step 73. Upon reception, the client can authenticate the card by retrieving the two challenges sent in previous exchanges.

2. Purse Registration

As mentioned previously, in order to receive tokens from other purses, a purse must be registered in the server which is responsible for inter-purses operations.

So, before a user A, for example a children, can receive tokens from a user B, for example one of his/her parents, the purse of user A must be registered in the server.

In a preferred embodiment of the invention, this registration phase will ensure that only members of the family can have their purse registered in the server. Of course this is not strictly limited to real members of the family and the purse registration can be extended to people "considered as" members of the family.

It is therefore proposed that a given member of the family has the root rights to register the purses of all members of the family. Unlike the other members of the family, only this privileged user, called the "root user" in the following, will be authorized to execute the registration phase. In the electronic wallet system, the root user is considered as a "third trust party" which will ensures that all registered purses are owned by a member of the family.

In order to implement this functionality, a special smart card for which the PIN has the root rights is provided by the electronic wallet system manufacturer together with the other entities of the system. This special card will be referred to as the "root card" in the following. The hashing of the root PIN H(root PIN) is stored in the server to provide the server a way to verify that the user who attempts to execute the registration phase is the root user. Moreover, in a preferred embodiment, the software for executing this registration phase is only contained in the server.

Now, we will describe more precisely how this registration phase is executed. We suppose that user A is the root user. When A wants to register in the server a purse $P_X$ belonging to a member X of the family, A has first to insert the root card in the server. The server will then execute the user authentication process as explained previously in view of FIG. 7 between a client and a smart card.

If A enters the root PIN on the user interface of the server, the hashing value of this entered PIN will match H(root PIN) which is stored in the server and A will be authorized to enter a new purse in the server for registration. In the contrary, the registration operation will be canceled.

When authorized, A has to insert the smart card belonging to user X in the server. The purse_id $P_X$ of this smart card will then be registered in the server and X will be able to receive tokens from other purses of the system. Of course, the root user A may also enter some other auxiliary information about the user X such as his/her name.

It should be noticed that, when the electronic wallet system is delivered to the customer with a number of smart card corresponding to the number of people in the family, the smart cards are in a "virgin" state. That means that they contain a unique purse_id, the secret key DFW_SK and the hashing H(PIN) of the PIN associated with this card but they contain neither token nor information about the user to whom they will belong.

3. Protection of Messages Between a Client and the Server

During the inter-purse transfer of tokens which involves two processes ("token deposit" and "token receipt") described previously in view of FIGS. 4 and 5, messages exchanged between the server and one client have to be protected as follows.

a) Messages Exchanged During the Token Deposit Process

Figure 8:
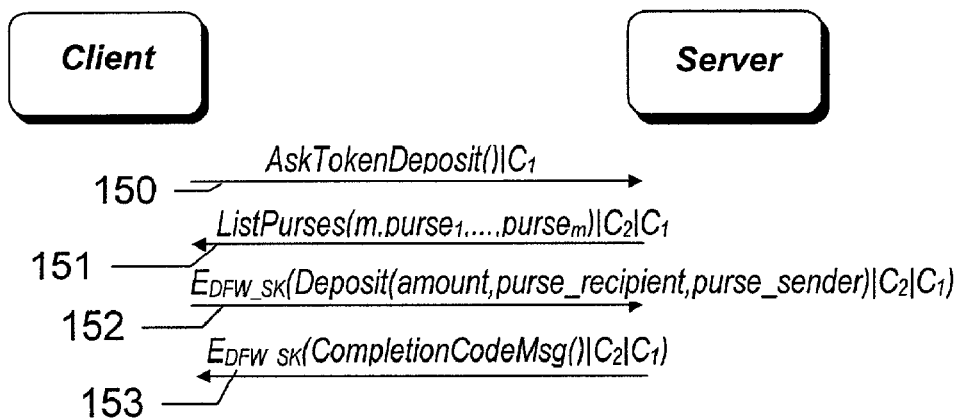
FIG. 8 illustrates the first process for transferring tokens from one purse to another in which security features have been added.

As illustrated in FIG. 4, three messages denoted by "AskTokenDeposit( )", "ListPurses( )" and "Deposit( )" are exchanged during this process. FIG. 8 illustrates the improved process in which security features have been added.

At first, a first challenge $C_1$ is generated in the client and concatenated to the message "AskTokenDeposit( )" when it is sent to the server at step 150. As previously mentioned, the challenge is a random number which is unique for each token assignment process. This feature aims at preventing an intruder to replay messages exchanged during previous token deposit process in order to debit purses which ask for a token deposit process.

When receiving this message, the server temporally stores the challenge $C_1$ and generates a challenge $C_2$ and it concatenates these two challenges to the "ListPurses( )" message which is sent back to the client at step 151. On receipt of this, the client temporally stores the challenge $C_2$. It will then concatenate the "Deposit( )" message to the two challenges $C_1$ and $C_2$ and encrypt the global message using the DFW_SK key. This encrypted message is sent to the server at step 152. The use of the two challenges $C_1$ and $C_2$ aims at preventing the "Deposit( )" message, which is dedicated to credit a registered purse, to be replayed to credit several times the same purse.

In addition, the "Deposit( )" message, which includes sensitive data (amount of tokens, recipient purse . . . ) is encrypted using the DFW_SK key in order to prevent a fraudulent user to modify these data during transmission of the message.

Moreover, the security features should ensure that money cannot be double spent. Therefore, before sending the "Deposit( )" message at step 152, the client debits the purse, i.e. the smart card inserted in the client, of the amount of tokens to be transferred to another purse. Debited tokens will be newly created and stored on the server side on receipt of the "Deposit( )" message.

Finally, in case of transmission problems or if the server has been unable to process the token deposit operation, the smart card must be credited again. For this purpose, a new message "CompletionCodeMsg( )" is created by the server and sent back to the client at step 153. The client can then check the completion code of the operation. If the completion code indicates no error, an operation receipt is stored in the smart card corresponding to the debited purse, and in the other cases, the purse is credited again. This "CompletionCodeMsg( )" message is concatenated to challenge C1 and challenge C2 and is encrypted using key DFW_SK before being sent at step 153.

b) Messages Exchanged During the Token Receipt Process

Figure 9:
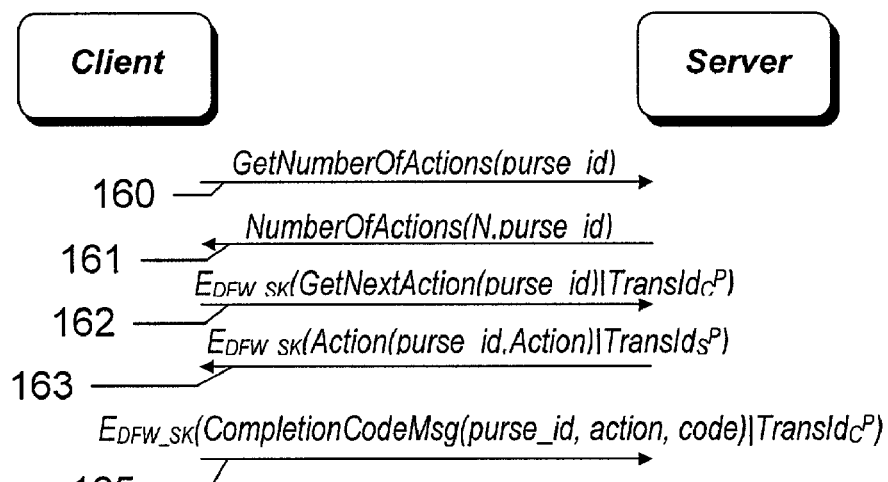
FIG. 9 illustrates the second process for transferring tokens from one purse to another in which security features have been added.

As illustrated in FIG. 5, four types of messages denoted by "GetNumberOfActions( )", "NumberOfActions( )", "GetNextAction( )" and "Action( )" are exchanged between the server and one client during this process. FIG. 9 illustrates the improved process in which security features have been added.

Messages "GetNumberOfActions( )" and "NumberOfActions( )", which are sent at steps 160 and 161 (similar to steps 60 and 61 in FIG. 5), do not contain any sensitive data. They can thus be sent as plain text.

However, the security features for the other messages should ensure that all actions which are stored on the server are protected so that a user A who owns a purse $P_A$ must not be able to route actions stored for a purse $P_B$ belonging to a user B towards his own purse $P_A$. Therefore, even if the message "Action( )" is protected (as we will see below), the user A should not be able to send the message "GetextAction( )" for a purse other than his own since in this case, the server clears the requested actions and thus the right recipient purse will never be credited. For this purpose, both messages "GetNextAction( )" and "Action( )", sent at steps 162 and 163, are encrypted using the shared secret key DFW_SK in order to protect the purse_id parameter.

The security features of the token receipt process should also ensure that the message "GetNextAction( )" cannot be replayed. Indeed, even if this message is encrypted, a solution should be proposed which ensures that an intruder cannot replay it because in this case, the next action stored in the server and intended to credit the corresponding purse will be cleared.

For this purpose, according to a preferred embodiment of the invention, each purse P, that is each smart card C, has a "transaction identifier" (denoted by $TransId_C^P$) of the last token recovery transaction. During the registration process (explained above in section 2.) the server set $TransId_C^P$ (which is stored in the smart card) to zero, and creates a new transaction identifier denoted by $TransId_S^P$ and which is also equal to zero. $TransId_S^P$ is stored in the server's local data, in the entry corresponding to the registered purse P. In this way, for each registered purse, there exist two transaction identifiers which are used in this recovery process to show the validity of exchanged messages.

Now, to ensure that the message "GetNextAction( )" cannot be replayed, the transaction identifier $TransId_C^P$ (stored in the smart card representing purse P) is concatenated to this message and the global message is encrypted using the shared secret key DFW_SK before being sent at step 162. Upon reception, the server verifies that $TransId_C^P = TransId_S^P$.

If the verification is positive, the server has to send the "Action( )" message to the client.

The security features of the token receipt process should moreover ensure that the "Action( )" message should not be replayed to credit several times the same purse. Therefore, before the server sends the "Action( )" message to the client, it increments the transaction identifier $TransId_S^P$ of the corresponding recipient purse P stored in the server, it inserts this incremented $TransId_S^P$ in the message and sends then the message at step 163 after having encrypted it using key DFW_SK.

Upon reception, the client can check the validity of the message by verifying: $TransId_C^P = TransId_S^P - 1$.

If the verification is positive, the transaction identifier $TransId^{cP}$ stored in the smart card inserted in the client is incremented and the action is executed.

Finally, the security features of the token receipt process should moreover ensure that a user who has credited his purse cannot claim that his purse has never been credited. To this end, a further message denoted by "CompletionCodeMsg(purse_id action, code)" (where "purse_id" is the identifier of the purse inserted in the client, "action" is the action executed and "code" is a completion code indicating the status of the executed action) is sent by the client towards the server at step 165 after execution of the action received. This message is dedicated to give information on the status of the executed operation. In addition, in a preferred embodiment, the transaction identifier $TransId_C^P$ stored in the smart card is concatenated to the message "CompletionCodeMsg( )" to ensure the non replay property and the global message is encrypted using the shared secret key DFW_SK to protect its content during transmission at step 165.

4. Protection of Commands Between a Client and a Smart Card

At the deepest level of implementation, commands are exchanged between the Wallet Manager software that runs on each client and the smart card inserted in the client in order to credit or debit tokens on the card representing a purse.

The security applied on these commands should ensure that:

i) all commands sent towards the smart card cannot be replayed to credit or debit a purse. For this purpose, the smart card generates a challenge $C_1$ to prevent all sent commands to be replayed;

ii) an intruder cannot disconnect the link between the client and the smart card and replay previous smart card's actions in order to avoid to debit the purse. In this case, money can be created in double since the purse has not been decremented and the intruder has responded to the command of the client. For this purpose, the client generates a challenge $C_2$ to authenticate the purse.

Figure 10:
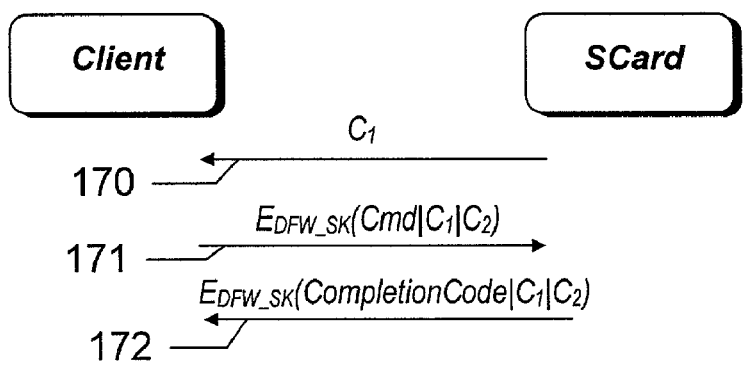
FIG. 10 illustrates some security features in the communication between a second and a third entities.

FIG. 10 illustrates the protection of a command "Cmd" between a client and a smart card.

We suppose that the client has to send a command Cmd to the card. First of all, it asks for a challenge to the smart card to ensure the freshness of the request. A first challenge $C_1$ generated in the smart card is sent at step 170 to the client.

Next, the client concatenates the challenge $C_1$ with a second challenge $C_2$ generated in the client and with the command Cmd to form a new message denoted by $Cmd|C_1|C_2$. Then, this new message is encrypted using the secret key DFW_SK and is sent at step 171 to the smart card.

On the smart card side, the integrity and the validity of the message can be checked by decrypting the received message using the shared secret key DFW_SK and by retrieving the challenge $C_1$. Once the command Cmd is executed, the smart card responds to the client by sending a message containing a completion code "CompletionCode" concatenated with the two challenges $C_1$ and $C_2$ and encrypted using key DFW_SK.

The invention claimed is:

1. Electronic wallet system comprising:
n devices capable of conducting electronic business transaction on an open network and containing a smart card reader, wherein n is greater or equal to 1, said devices being interconnected through a local network;
a plurality of smart cards representing electronic purses of said electronic wallet system, said smart cards being able to contain tokens;
wherein one of said devices comprises an entity, called the server, which contains a list of data entries, each entry corresponding to a purse of said electronic wallet system liable to receive tokens from other purses of said system, the tokens transferred between purses being stored temporally by said server, and wherein tokens are transferred from one first purse to a second purse in two stages;

tokens assigned to said second purse being deposited with said server from said first purse during the first stage, and tokens being credited to said second purse from said server during the second stage.

2. System according to claim 1, wherein operations executed during said first stage and operations executed during said second stage are performed in two different times.

3. System according to claim 1, wherein each of said device further comprises an entity, called the client and wherein operations executed during each of said first stage or second stage may be performed from anyone of said clients.

4. Process for depositing tokens from a first purse for a second purse in an electronic wallet system according to claim 3 comprising the steps consisting, for a device containing a client entity, in:

a) receiving a first smart card corresponding to said first purse;

b) sending a first message to the server to request a token deposit;

c) receiving from said server a list of purses liable to receive tokens; and d) sending a second message containing an amount of tokens and a purse identifier corresponding to said second purse to deposit said amount of tokens with said server for said second purse.

5. Process according to claim 4, wherein a first challenge is generated by said client before step b), said first challenge being concatenated to said first message sent to the server and wherein a second challenge is received at step c) from said server with the list of purses liable to receive tokens, in a message containing said first challenge;

said process further comprising a step consisting in checking that the first challenge received at step c) equals said first challenge generated before step b);

said first and second challenge being concatenated to the second message send at step d).

6. Process according to claim 4, in a system in which each device further contains a secret key, wherein said second message is sent encrypted using said secret key.

7. Process according to claim 6, wherein the amount of tokens is debited from said first purse before step d) and wherein said process further comprises the steps consisting in:

e) receiving a third message from said server, said third message containing a completion code of the deposit operation with the server;

f) checking said completion code and:

storing an operation receipt in said smart card if said completion code indicates no error; or crediting again said first purse with said amount of tokens if said completion code indicates one error.

8. Process according to claim 7, wherein the first and the second challenges are concatenated to said third message received at step e) and wherein step f) further consists in checking that:

said first challenge received in said third message equals the first challenge generated before step b) and said second challenge received in said third message equals the second challenge received at step c).

9. Process according to claim 8, wherein said third message is encrypted using said secret key.

10. Process for depositing tokens from a first purse for a second purse in an electronic wallet system according to claim 3 comprising the steps consisting, for a device containing the server, in:

i) receiving from a client a first message requesting a token deposit;

j) sending to said client a list of purses liable to receive tokens;

k) receiving from said client a second message containing an amount of tokens and a purse identifier corresponding to said second purse; and l) storing said amount of tokens in the data entry corresponding to said second purse.

11. Process according to claim 10, wherein a first challenge, concatenated with said first message, is received at step i) and wherein a second challenge is generated by said server before step j), said second challenge being concatenated to the list of purses sent at step j) in a message containing said first challenge;

said first and second challenge being concatenated to said second message received at step k);

said process further comprising a step consisting in checking that the second challenge received at step k) equals said second challenge generated before step j).

12. Process according to claim 10, in a system in which each device further contains a secret key, wherein said second message is encrypted using said secret key.

13. Process for receiving tokens in a second purse in an electronic wallet system according to claim 3 comprising the steps consisting, for a device containing a client entity, in:

m) receiving a smart card corresponding to said second purse;

n) sending a fourth message to the server to request the receipt of tokens deposited with the server for said second purse;

o) receiving a fifth message containing a number N of actions stored by the server in the data entry corresponding to said second purse, each action containing an amount of tokens received from one purse of said electronic wallet system; and p) for each action i between 1 to N:

p1) sending a sixth message to the server to request the next action i;

p2) receiving a seventh message from the server containing said action i; and p3) storing in said smart card corresponding to the second purse the amount of tokens contained in said action i.

14. Process according to claim 13, in a system in which purses are registered in the server further comprising the steps consisting:

for the device containing a client, in concatenating the smart card purse transaction identifier corresponding to the second purse to said sixth message sent at step p1);

for the device containing the server:

in verifying that said smart card purse transaction identifier equals the server purse transaction identifier stored in the server in said second purse data entry and, should verification be positive:

in incrementing said server purse transaction identifier stored in the server, and in concatenating said incremented server purse transaction identifier to said seventh message; and for the device containing a client, in verifying that said server purse transaction identifier received at step p2) in said seventh message equals said smart card purse transaction identifier minus one, and should verification be positive, in performing step p3).

15. Process according to claim 14, further comprising the step consisting, for the device containing a client, in:

incrementing said smart card purse transaction identifier, and sending a completion code message to the server, said completion code message containing a code indicating the status of the operation executed at step p3) and said incremented smart card purse transaction identifier.

16. Process for registering a purse in the server of a system according to claim 1, said process comprising the steps consisting for a device in:

receiving a specific smart card, called the root card;

receiving a personal identification number entered by a user on said device;

verifying that said entered personal identification number matches a personal identification number stored in said root card; and, should verification be positive:

receiving a smart card corresponding to the purse to be registered, said smart card containing a purse identifier; and storing said purse identifier in the list of data entries contained in said server.

17. Process according to claim 16 wherein said device contains the server.

18. Process according to claim 16 wherein:

a smart card purse transaction identifier is stored in said smart card corresponding to the registered purse and is initialized to zero and a server purse transaction identifier is stored in the data entry corresponding to said registered purse in the server and is initialized to zero.

* * * * *